(12) United States Patent
Endo et al.

(10) Patent No.: US 7,879,265 B2
(45) Date of Patent: Feb. 1, 2011

(54) ACTIVE MATERIAL FOR LITHIUM ION BATTERY HAVING AL-CONTAINING LITHIUM TITANATE AND LITHIUM ION BATTERY

(75) Inventors: Daisuke Endo, Kyoto (JP); Tokuo Inamasu, Kyoto (JP); Toshiyuki Nukuda, Kyoto (JP); Yoshihiro Katayama, Kyoto (JP)

(73) Assignee: GS Yuasa Corporation, Kyoto-Shi, Kyoto (JP)

( * ) Notice: Subject to any disclaimer, the term of this patent is extended or adjusted under 35 U.S.C. 154(b) by 110 days.

(21) Appl. No.: 11/887,406

(22) PCT Filed: Mar. 22, 2006

(86) PCT No.: PCT/JP2006/306378

§ 371 (c)(1),
(2), (4) Date: Sep. 28, 2007

(87) PCT Pub. No.: WO2006/106700

PCT Pub. Date: Oct. 12, 2006

(65) Prior Publication Data
US 2009/0127503 A1 May 21, 2009

(30) Foreign Application Priority Data
Mar. 30, 2005 (JP) ............................ 2005-098962

(51) Int. Cl.
H01B 1/02 (2006.01)
H01M 4/02 (2006.01)
H01M 4/88 (2006.01)
H01M 4/58 (2006.01)
H01M 6/18 (2006.01)
C01G 45/12 (2006.01)
C01G 15/00 (2006.01)
C01F 3/00 (2006.01)
C01F 7/02 (2006.01)
C01D 1/00 (2006.01)
C01D 15/02 (2006.01)
C01D 3/08 (2006.01)
C01D 15/00 (2006.01)
C01B 13/00 (2006.01)

(52) U.S. Cl. ............................ 252/520.21; 252/519.12; 252/182.1; 429/209; 429/218.1; 429/231.5; 429/231.6; 429/231.95; 429/304; 423/179; 423/579; 423/592.1; 423/593.1; 423/598; 423/594.5; 423/624; 423/625; 423/641; 136/205

(58) Field of Classification Search ............ 252/519.12, 252/182.1, 520.21; 429/304, 209, 218.1, 429/231.5, 231.6, 231.95; 423/179, 579, 423/592.1, 593.1, 598, 594.15, 624, 625, 423/641; 136/205
See application file for complete search history.

(56) References Cited

FOREIGN PATENT DOCUMENTS

| JP | 2000-156229 | 6/2000 |
|---|---|---|
| JP | 2004-235144 | 8/2004 |
| JP | 2004235144 A * | 8/2004 |

OTHER PUBLICATIONS

Shahua Huang et al, Preparation and Electrochemical performance of spinel-type compounds $Li_4Al_yTi_{5-y}O_{12}$, , Journal of the Electrochemical Society, vol. 152, No. 1, Jan. 2005, pp. A186-A190.

A.D. Robertson et al, New inorganic spinel oxides for use as negative electrode materials in future lithium-iion batteries, Journal of Power Sources, vol. 81-82, 1999, pp. 352 to 357.

* cited by examiner

Primary Examiner—Milton I Cano
Assistant Examiner—Aaron Greso
(74) Attorney, Agent, or Firm—Manabu Kanesaka

(57) ABSTRACT

It is an object of the present invention to provide an active material for lithium ion battery capable of producing a lithium ion battery having an excellent high rate charge and discharge performance and a lithium ion battery having an excellent high rate charge and discharge performance. The present invention provides an active material for lithium ion battery represented by a composition formula: $Li[Li_{(1-x)/3} Al_xTi_{(5-2x)/3}]O_4$ ($1/8 \leq x < 1$) lithium titanate is substituted with Al, and a lithium ion battery using this active material as a negative electrode active material.

5 Claims, 3 Drawing Sheets $Li[Li_{(1-x)/3} Al_x Ti_{(5-2x)/3}]O_4 \ (0<x<1)$

ACTIVE MATERIAL FOR LITHIUM ION BATTERY HAVING AL-CONTAINING LITHIUM TITANATE AND LITHIUM ION BATTERY

This is a Nation Stage Application of PCT/JP2006/306378 filed on Mar. 22, 2006 which claims priority to Japanese application No. 2005-098962 filed on Mar. 30, 2005.

TECHNICAL FIELD

The present invention relates to an active material for lithium ion battery having Al-containing lithium titanate and a lithium ion battery.

BACKGROUND ART

Associated with recent small-sized high-performance mobile phones and electronic devices, nonaqueous electrolyte batteries such as lithium secondary batteries exhibiting high energy density with high voltage draw attention and are widely used as the power source thereof.

Conventionally, it is known to use lithium titanate as an active material for a negative electrode in such lithium secondary batteries and lithium ion batteries (see, Patent Document 1). Further, it is known to substitute a part of the element of the lithium titanate with Fe (see, Patent Document 2), with Cu (see, Patent Document 3) and with other transition metals and the like (see, Patent Documents 4 to 6).

Patent Document 1: JP 06-275263-A
Patent Document 2: JP 2001-185141-A
Patent Document 3: JP 2001-250554-A
Patent Document 4: JP 2004-235144-A
Patent Document 5: JP 10-251020-A
Patent Document 6: JP 2000-156229-A Particularly, Patent Document 4, describes an invention of "a negative electrode active material for nonaqueous secondary battery having a lithium transition metal composite oxide having a spinel structure containing an alkali metal and/or alkali earth metal." (claim 1), and "the lithium transition metal composite oxide is a negative electrode active material for nonaqueous secondary battery according to claim 1 or 2" containing aluminum (claim 3). It also describes that "by including aluminum, a part of the transition metal of the lithium transition metal composite oxide is substituted with aluminum, thus, it is conceivable that the crystalline structure is stabilized and the cycle performance is improved." (paragraph [0024]). However, since there is described that "by containing alkali metal and/or alkali earth metal, a crystalline structure of the lithium transition metal composite oxide having a spinel structure is stabilized, thus, it is conceivable that the cycle performance is improved." (paragraph [0022]), it is essential that an element entering into 16d site "contains an alkali metal and/or alkali earth metal" as described in claim 1. Thus, it is not suggested that the cycle performance is improved by substituting a part of the transition metal of the lithium transition metal composite oxide only with aluminum, and moreover, it is not disclosed that a high rate charge and discharge performance is improved by such a substitution.

Patent Document 5 describes an invention of "metal-substituted lithium titanate represented by a general formula $Li_xM_yTi_zO_4$ (where M is a metal having a valence of two or more, and $0.5 \leq (X+Y)/z \leq 2$), wherein a part of a lithium component of lithium titanate is substituted by a metal having a valence of two or more." (claim 1), and aluminum is described as a metal having a valence of two or more (claim 2). However, since it describes that "doping and dedoping of lithium ions are facilitated by substituting a part of a lithium component with a metal having a valence of two or more, thereby improving the performances such as battery capacity and the like when used as an electrode for lithium battery." (paragraph [0006], only a part of the lithium component is substituted with aluminum, and titanium component is not substituted therewith. Further, this invention is not intended to provide a lithium ion battery having an excellent high rate charge and discharge performance.

It is further known to use a spinel compound represented by a composition formula: $Li_4Al_yTi_{5-y}O_{12}$ (y=0, 0.10, 0.15, 0.25) as an electrode for lithium battery (see, Non-Patent Document 1).

Non-Patent Document 1: Journal of The Electrochemical Society, 152(1) A186-A190 (2005)

The spinel compound in Non-Patent Document 1 is one in which only a part of Ti of $Li_4Ti_5O_{12}$ (lithium titanate) is substituted with Al. Although it is described that a higher capacity lithium ion battery can be obtained by using this Al-containing lithium titanate, it is not described that a lithium ion battery having an excellent high rate charge and discharge performance can be obtained. Moreover, in the above-described composition formula, Al is a representative element of trivalent ($Al^{3+}$), and since only a part of tetravalent Ti component ($Ti^{4+}$) is substituted with Al having the same number of moles and no monovalent Li component ($Li^{1+}$) is substituted with Al, a part of Ti becomes partially pentavalent ($Ti^{5+}$).

On the other hand, a spinel compound represented by a composition formula: $Li[Li_{(1-x)/3}Cr_xTi_{(5-2x)/3}]$ is further known as a negative electrode active material for lithium ion battery (see, Non-Patent Document 2).

Non-Patent Document 2: Journal of Power Sources, 125 (2004) 242-245

The spinel compound in Non-Patent Document 2 is one in which a part of Li- and Ti components of $Li_{4/3}Ti_{5/3}O_4$ (lithium titanate) is substituted with Cr. Although it is described that diffusion coefficient and high rate discharge performance are improved by using this Cr-containing lithium titanate, no substitution with any other metal than Cr is described. Moreover, as described below, when a part of Ti component of lithium titanate is substituted with Cr, the improvement of high rate discharge performance is not sufficient.

That is, in the above-described composition formula, Cr is trivalent ($Cr^{3+}$) and Ti is tetravalent ($Ti^{4+}$). However, since Cr is a transition metal, the valence number of Cr will vary due to electrochemical reduction of lithium titanate when such lithium titanate is used as a negative electrode active material for battery. In order for a battery including a negative electrode containing lithium titanate to have an excellent high rate discharge performance, it is important that tetravalent Ti ($Ti^{4+}$) and trivalent Ti ($Ti^{3+}$) coexist in lithium titanate contained in the negative electrode which has been charged for the first time after the composition of the battery and it is further desired that trivalent Ti ($Ti^{3+}$) exists more than tetravalent Ti ($Ti^{4+}$). However, so the valence number of Cr varies due to the discharge of the battery, trivalent Ti ($Ti^{3+}$) is insufficiently produced, thereby making it difficult to exhibit an above-described effect.

DISCLOSURE OF THE INVENTION

Problems to be Solved by the Invention

As described above, it is known to use lithium titanate or lithium titanate substituted with a transition metal or the like as a negative electrode active material for lithium ion battery. However, the high rate charge and discharge performance thereof is not satisfactory, and an active material capable of improving the high rate charge and discharge performance of a lithium ion battery is desired.

The present invention has been made in view of the foregoing, and it is a technical object of the present invention to provide an active material for lithium ion battery realizing a lithium ion battery having an excellent high rate charge and discharge performance, and further to provide a lithium ion battery having an excellent high rate charge and discharge performance.

Means for Solving the Problems

As a means for solving the above-described problems, an active material for lithium ion battery according to the present invention has a particular composition in which parts of both titanium (Ti) and lithium (Li) of lithium titanate are substituted with aluminum (Al) and that Ti is tetravalent ($Ti^{4+}$) as an active material at least before the first electrochemical reduction is carried out after the composition of a battery. That is, in Al-containing lithium titanate having a composition formula as in the invention described in the Non-Patent Document 1, a part of Ti inevitably becomes pentavalent ($Ti^{5+}$). By substituting parts of both Ti and lithium Li of lithium titanate with Al to use a spinel compound containing tetravalent Ti ($Ti^{4+}$) as an active material for lithium ion battery, the present invention solves the above-described problems.

In order to solve the above-described problems the present invention employs the following means:

(1) an active material for lithium ion battery represented by a composition formula:

$Li[(Li_{(1-x)/3}Al_xTi_{(5-x)/3}]O_4 (0 \leq x \leq 1)$;

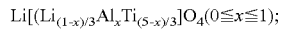

(2) the active material for lithium ion battery of the above-described (1) characterized in that $0 < x \leq 1/2$; and (3) a lithium ion battery using the active material for lithium ion battery of the above-described (1) or (2) as a negative electrode active material.

ADVANTAGE OF THE INVENTION

The active material for lithium ion battery according to the present invention can provide an active material in which Ti is tetravalent ($Ti^{4+}$), and further can provide a lithium ion battery having an excellent high rate charge and discharge performance by using the active material as a negative electrode active material.

BEST MODE FOR CARRYING OUT THE INVENTION

Figure 1:
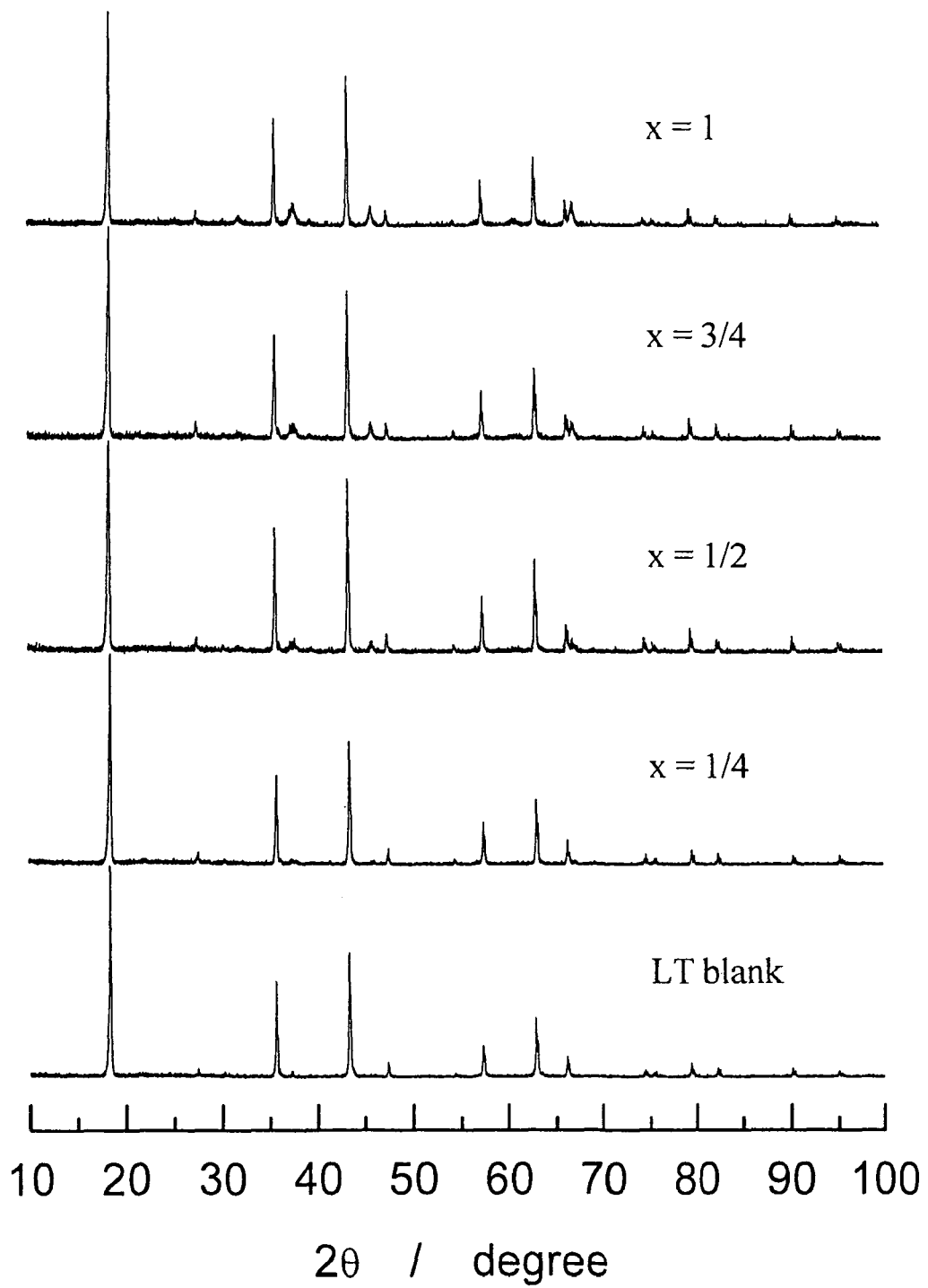
FIG. 1 is a diagram showing a result of X-ray diffraction measurements of $Li[Li_{(1-x)/3}Al_xTi_{(5-2x)/3}]O_4$ ($0 < x < 1$).

Now, the present invention will be described with reference to the embodiments of the invention, however, before this description, the present invention will be described in more detail.

Since $Li[Li_{1/3}Ti_{5/3}]O_4$ as a base material of the active material of the present invention has no volume strain, it is used as a long-life battery material. It is a flat potential which shows a reversible electrode potential of 1.55V (vs. $Li/Li^+$) during oxidation-reduction and it has a small risk of side reactions such as reductive decomposition of an electrolyte and the like. However, due to the existence of $Ti^{4+}$ having no d-electrons, this material is an undesirable insulator as an active material with poor conductivity.

As a means for solving the problem, a large amount of conductive agent and binder may be added in forming an electrode. However, since the amount of an active material that can be filled in a battery is limited to obtain capacity, it is preferable to use a material which is as high as possible both in conductivity and bulk density.

So, the present inventors have tried to solve the above-described problem of conductivity by substituting a part of a six-coordinate 16d site of $Li[Li_{1/3}Ti_{5/3}]O_4$ having a spinel structure with a heterogeneous element. That is, "Al" has been selected as a substitution element for $Li[Li_{1/3}Ti_{5/3}]O_4$. That is to say, the redox species of $Li[Li_{1/3}Ti_{5/3}]O_4$ is a tetravalent Ti, and with a completely reduced $Li_2[Li_{1/3}Ti_{5/3}]O_4$, a two-phase reaction results in a mixed atomic valence state of tri- and tetravalence in which conductive $Ti^{3+}$ coexists. This reaction produces a reversible electrode potential of 1.55 v (vs. Li). That is, if the substitution element itself becomes a redox species, such a potential cannot be produced. Therefore, it is considered preferable that $Ti^{4+}$ assumes redox by performing substitution not with a transition metal, but with a representative element having a constant valence number.

On the other hand, there are a large number of examples in which substitution is performed with a transition metal (see, the above-described Patent Documents 2 to 6). The representative example includes $LiFeTiO_4$, $Li[CuTi]O_4$ or the like (see, the above-described Patent Documents 2 and 3).

However, for $Li[CuTi]O_4$, since the redox species on the reduction process is $Ti^{4+}$, a reversible electrode potential of about 1.5 V (vs. $Li/Li^+$) can be obtained, whereas, for $LiFeTiO_4$, since the redox species on the reduction process is $Fe^{3+}$, such a reversible electrode potential cannot be obtained.

The active material for lithium ion battery according to the present invention corresponds a part of a six-coordinate 16d site of $Li[Li_{1/3}Ti_{5/3}]O_4$ were substituted with "Al" and is represented by a composition formula: $Li[Li_{(1-x)/3}Al_xTi_{(5-2x)/3}]O_4$ ($0 < x < 1$), as described above, derived from the number of atoms contained in this site and the number of contained electrons derived from the valence number. Moreover, even if the composition of the active material for lithium ion battery according to the present invention includes more or less variations from theoretical value, they shall fall within the range of error.

(Embodiment of Active Material for Lithium Ion Battery of the Invention)

As described above, the active material for lithium ion battery according to the present invention corresponds a part of a six-coordinate 16d site of $Li[Li_{1/3}Ti_{5/3}]O_4$ were substituted with "Al" and is represented by a composition formula: $Li[Li_{(1-x)/3}Al_xTi_{(5-2x)/3}]O_4$ ($0 < x < 1$) derived from the number of atoms contained in this site and the number of contained electrons derived from the valence number. The synthesis method thereof is not particularly limited. However, the active material for lithium ion battery can be synthesized by firing, for example, $Li_2CO_3$ as lithium source, $TiO_2$ (anatase-type) as titanium source and $Al(OH)_3$ as aluminum source in an air atmosphere or the like with varying the amount of Al so that the resulting active material may be represented by the composition formula: $\text{Li}[\text{Li}_{(1-x)/3}\text{Al}_x\text{Ti}_{(5-2x)/3}]\text{O}_4$ (0<x<1).

(Embodiment of Lithium Ion Battery of the Invention)

In using the active material of the present invention as a negative electrode active material for lithium ion battery, the positive electrode active material as a counter electrode thereof is not particularly limited. However, the positive electrode active material may include a 3.5V-class active material such as $\text{LiFePO}_4$, 4V-class positive electrode active materials such as $\text{LiCo}_x\text{Ni}_y\text{Mn}_{1-x-y}\text{O}_2$ (0<x<1) having a layer structure and $\text{Li}[\text{Li}_x\text{Mn}_{2-x}]\text{O}_4$ (0<x<⅓) having a spinel structure, or a 5V-class active material such as $\text{Li}[\text{M}_x\text{Mn}_{2-x}]\text{O}_4$ (0<x<1; M is a 3d transition metal element).

Moreover, as an electrolyte, any obvious electrolyte can be arbitrarily used and is not limited by the present invention. However, for example, the electrolyte may include one in which $\text{LiPF}_6$ is dissolved in a mixed solvent of ethylene carbonate, ethylmethyl carbonate and dimethyl carbonate.

In addition, as a separator there can be used a polypropylene microporous film of which surface has been modified by polyacrylate to improve the retention capacity of electrolyte. Further, as an exterior body there can be used a metallic resin composite film composed of polyethylene terephthalate, aluminum foil and metal-adhesive polypropylene film. However, these separator, exterior body and the like are not particularly limited by the present invention.

EXAMPLE

Now, an example of the present invention will be described together with a comparative example, and the present invention will be described concretely. However, the present invention is not limited by the following examples.

(Synthesis of Active Materials)

For synthesizing the active materials of the present invention, the lithium source is $\text{Li}_2\text{CO}_3$, the titanium source is $\text{TiO}_2$ (anatase-type), and the aluminum source is $\text{Al(OH)}_3$. The active materials were synthesized by firing these sources at 800° C. for 12 hours in an air atmosphere with changing the amount of Al variously so as the resulting active materials to be represented by the composition formula: $\text{Li}[\text{Li}_{(1-x)/3}\text{Al}_x\text{Ti}_{(5-2x)/3}]\text{O}_4$ (0<x<1) (concretely, the amount of Al was selected so as the "x" in the above-described composition formula to be represented by "⅛, ¼, ½, ¾ and 1").

X-ray diffraction measurements were performed for the obtained active materials and characterization of crystalline structures was performed. As a result, as shown in FIG. 1, a single phase which can be attributed to a spinel structure in an substitution amount of up to x=½ was obtained.

It is considered in theory that the effect of the invention is increased when the value of x in the above-described composition formula is large. Further, it is considered that the larger the value of x is, the more the effect of enabling a reversible electrode potential of 1.55V (vs. Li) as described above to be obtained by performing substitution with Al having a constant valence number. However, if the value of x is too high, there occurs a problem that the obtained active materials have no uniform composition and poor discharge capacity. According to experiments, by keeping the value of x less than or equal to ½, as described above, uniform compositions can be obtained, and active materials capable of exerting the effect of the present invention can be obtained. Therefore, in the present invention, "the active materials in which x is less than or equal to ½" are particularly preferable. Further, it is preferable to keep the value of x not less than 0.1 so that the effect of the present invention can be made sufficient.

Among the obtained active materials $\text{Li}[\text{Li}_{1/4}\text{Al}_{1/4}\text{Ti}_{3/2}]\text{O}_4$ having x=¼ was used as a negative electrode active material for lithium ion battery, and a lithium ion battery was produced as follows and the battery was evaluated.

[Production of Lithium Ion Battery]

$\text{Li}[\text{Li}_{1/4}\text{Al}_{1/4}\text{Ti}_{3/2}]\text{O}_4$ active material, acetylene black (AB) and polyvinylidene fluoride (PVdF) were mixed at a "weight ratio of 90:5:5" and N-methylpyrrolidone was added as a dispersing medium thereto. The mixture was kneaded and dispersed to prepare a coating solution. Where, as PVdF, a liquid in which solid content was dissolved and dispersed was used, and was converted into solid weight.

The coating solution was applied to aluminum foil collector having a thickness of 20 μm to fabricate a negative electrode plate. Moreover, in order to ensure similar test conditions for all batteries, the weight and thickness of the electrodes were unified.

For a counter electrode, $\text{LiCoO}_2$ was employed and used as a positive electrode active material. The counter electrode was fabricated similar to the negative electrode. However, the weight of the positive electrode plate was adjusted to be about 1.5 times as heavy as that of the negative electrode plate so that the capacity of the lithium ion battery might control the negative electrode.

As an electrolyte, there was used one in which $\text{LiPF}_6$ was dissolved in a mixed solvent of ethylene carbonate (EC), ethylmethyl carbonate (EMC) and dimethyl carbonate (DMC) having a "volume ratio of 6:7:7" so as the solution to have a concentration of 1 mol/l.

As a separator, there was used a polypropylene microporous film of which surface was modified by polyacrylate to improve the retention capacity of an electrolyte. Moreover, as a reference electrode, a lithium metallic foil put on a nickel plate was used.

For the exterior body, there was used a metallic resin composite film composed of polyethylene terephthalate (15 μm), aluminum foil (50 μm) and metal-adhesive polypropylene film (50 μm). In the exterior body, electrodes were contained so that the open ends of the positive electrode terminal, negative electrode terminal and reference electrode terminal were exposed outside. The fusion zones where the inner surfaces of the metallic resin composite film were opposed were sealed airtight except a portion where a pouring spout was formed.

Under the above-described conditions, the lithium ion battery of the example was produced.

A lithium ion battery of a comparative example was produced under the conditions similar to those of the example except that $\text{Li}[\text{Li}_{1/4}\text{Al}_{1/4}\text{Ti}_{3/2}]\text{O}_4$ as a negative electrode active material was replaced with $\text{Li}[\text{Li}_{1/3}\text{Ti}_{5/3}]\text{O}_4$.

[Evaluation Test of Battery Characteristic]

The lithium ion batteries produced as described above were subjected to a charge and discharge test of 5 cycles for an initial activation step. As test conditions, a negative electrode potential with respect to the reference electrode was monitored, charge (negative electrode reduction) was performed up to 1.0 V at a current value of 0.1 ItA, and then discharge (negative electrode oxidation) was performed up to 2.5 V at the same current value. In all cycles, a resting period of 30 minutes was set between charge and discharge.

Next, a battery test for assessing the high rate discharge performance was performed. Under conditions similar to those in the initial activation step a negative electrode potential with respect to the reference electrode was monitored in the test. The currents at the time of charge (negative electrode reduction) were uniformly set to "0.1 ItA", and the currents at the time of discharge (negative electrode oxidation) were set to "0.2 ItA, 1 ItA, 2 ItA, 3 ItA and 5 ItA" in this order. Where, a step of: resting for 30 minutes after the end of one high rate discharge test; performing discharge (negative electrode oxidation) at a current value of 0.1 ItA after recovery to an open circuit potential; and performing charge (negative electrode reduction) after resting further for 30 minutes was repeated.

Figure 2:
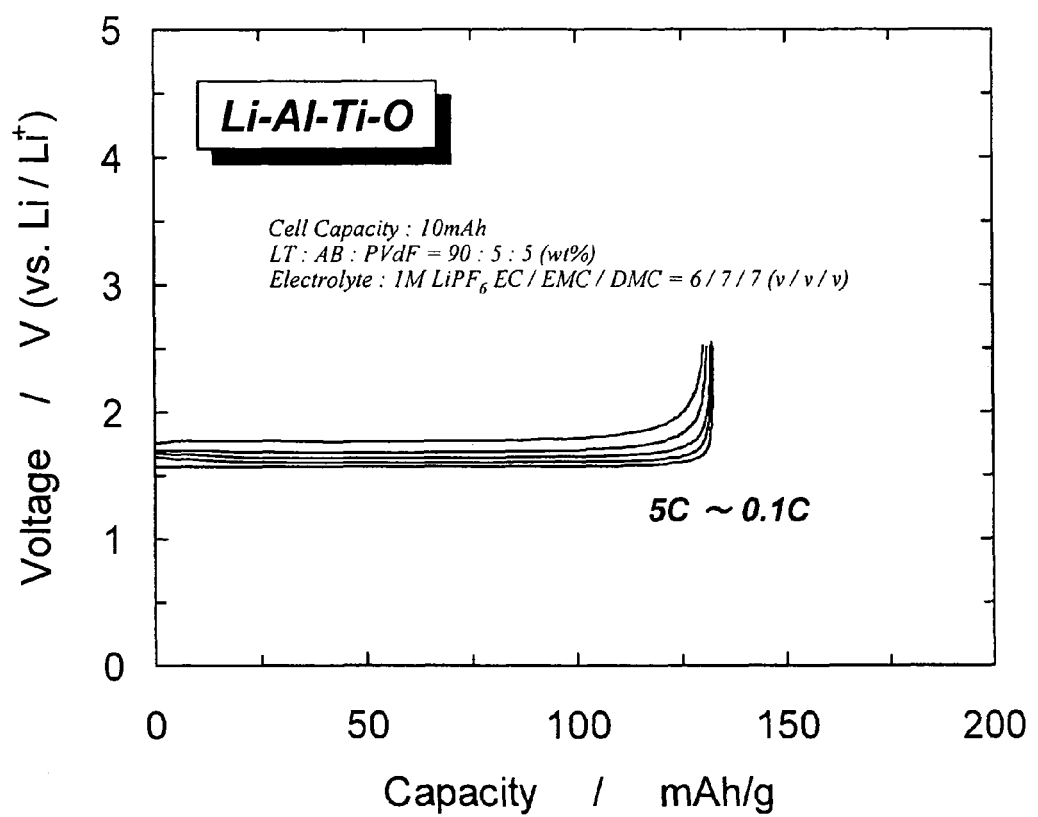
FIG. 2 is a graph showing a result of high rate discharge test of a lithium ion battery (example) using $Li[Li_{1/4}Al_{1/4}Ti_{3/2}]O_4$ as a negative electrode active material.

A result of the high rate discharge test of the lithium ion battery (example) using $Li[Li_{3/4}Al_{1/4}Ti_{3/2}]O_4$ as a negative electrode active material is shown in FIG. 2.

Figure 3:
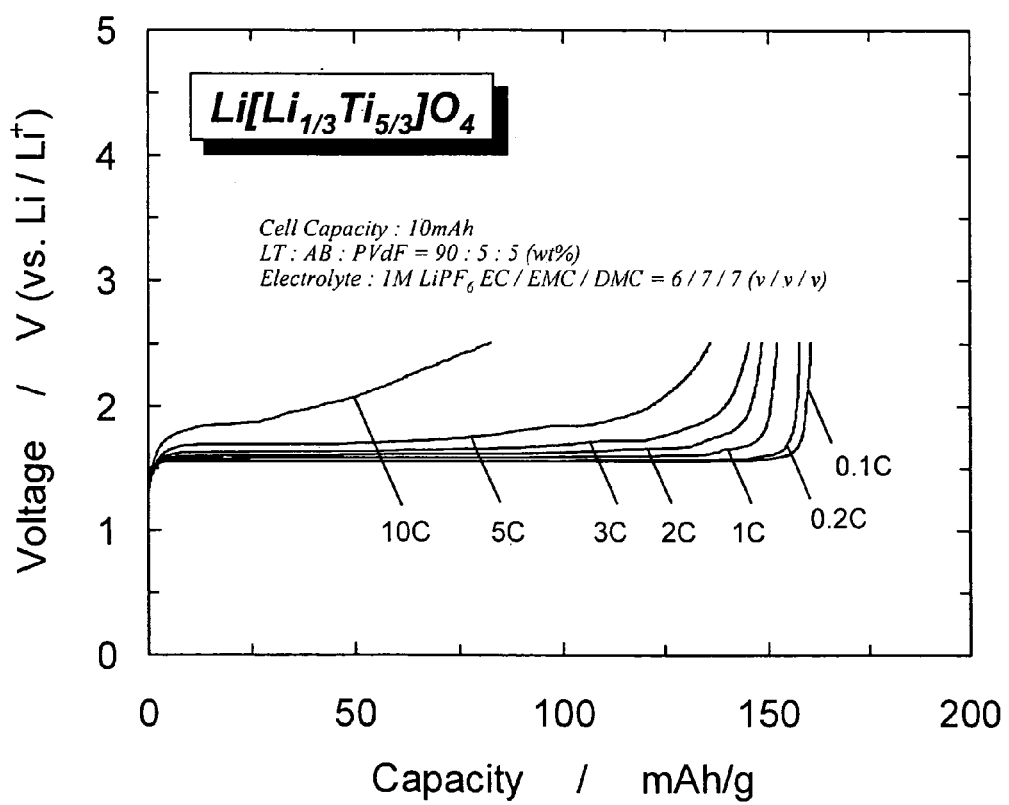
FIG. 3 is a graph showing a result of a high rate discharge test of a lithium ion battery (comparative example) using $Li[Li_{1/3}Ti_{5/3}]O_4$ as a negative electrode active material.

A result of the high rate discharge test of the lithium ion battery (comparative example) using $Li[Li_{1/3}Ti_{5/3}]O_4$ as a negative electrode active material is shown in FIG. 3.

Moreover, results of these battery tests are shown in Table 1. The values indicated in Table 1 shows the ratio of the discharge capacities at the respective subsequent current values to the charge capacity at 0.1 ItA in percentage.

The example of Table 1 is a battery using $Li[Li_{1/4}Al_{1/4}Ti_{3/2}]O_4$ as a negative electrode active material, and the comparative example is a battery using $Li[Li_{1/3}Ti_{5/3}]O_4$ as a negative electrode active material.

TABLE 1

| | Current Value | | | | | |
|---|---|---|---|---|---|---|
| | 0.2 ItA | 1 ItA | 2 ItA | 3 ItA | 5 ItA | 10 ItA |
| Example | 100.8 | 97.2 | 95.0 | 93.4 | 90.5 | 72.6 |
| Comparative Example | 101.2 | 95.3 | 88.2 | 93.0 | 76.4 | 46.1 |

(Unit: %)

From the comparison of FIG. 2 and FIG. 3 and from Table 1, it is understood that the active material of the example $Li[Li_{1/4}Al_{1/4}Ti_{3/2}]O_4$ in which a part of the elements of $Li[Li_{1/3}Ti_{5/3}]O_4$ is substituted with Al was a more excellent high rate charge and discharge performance than the active material of the comparative example $Li[Li_{1/3}Ti_{5/3}]O_4$.

INDUSTRIAL APPLICABILITY

As described above in detail, the present invention provides an active material for lithium ion battery for producing a lithium ion battery having an excellent high rate charge and discharge performance and a lithium ion battery having an excellent high rate charge and discharge performance. The industrial applicability thereof is very outstanding.

The invention claimed is:

1. An active material for lithium ion battery comprising a composition represented by a formula: $Li[Li_{(1-x)/3}Al_xTi_{(5-2x)/3}]O_4$ ($1/8 \leq x < 1$).

2. The active material for lithium ion battery according to claim 1, wherein $1/8 \leq x \leq 1/2$.

3. A lithium ion battery using the active material for lithium ion battery according to claim 1 as a negative electrode active material.

4. The active material for lithium ion battery according to claim 1, wherein the composition comprises lithium titanate wherein parts of Ti and Li of the lithium titanate are substituted with Al to use a spinel compound containing tetravalent Ti as an active material for the lithium ion battery.

5. The active material for lithium ion battery according to claim 1, wherein $1/4 \leq x \leq 1/2$.

* * * * *